(12) United States Patent
Ko et al.

(10) Patent No.: US 9,617,434 B2
(45) Date of Patent: Apr. 11, 2017

(54) AMPHIPHILIC HYDROGEL PARTICLES FOR ANTIFOULING PAINT AND METHOD OF FABRICATING THE SAME

(71) Applicant: Korea Institute of Ocean Science & Technology, Ansan-si (KR)

(72) Inventors: Jin Hwan Ko, Seoul (KR); Kwang-Soo Lee, Seoul (KR); Jin-Soon Park, Ansan-si (KR); Ho Sup Jung, Incheon (KR); Moon Kyu Kwak, Daegu (KR)

(73) Assignee: KOREA INSTITUTE OF OCEAN SCIENCE & TECHNOLOGY, Ansan-si (KR)

( * ) Notice: Subject to any disclaimer, the term of this patent is extended or adjusted under 35 U.S.C. 154(b) by 0 days.

(21) Appl. No.: 14/923,792

(22) Filed: Oct. 27, 2015

(65) Prior Publication Data

US 2016/0326378 A1 Nov. 10, 2016

(30) Foreign Application Priority Data

May 6, 2015 (KR) .................. 10-2015-0063187

(51) Int. Cl.
*C09D 5/16* (2006.01)
*C09D 5/08* (2006.01)

(52) U.S. Cl.
CPC ........... *C09D 5/1637* (2013.01); *C09D 5/082* (2013.01); *C09D 5/1625* (2013.01); *C09D 5/1687* (2013.01)

(58) Field of Classification Search
CPC .... C09D 5/082; C09D 5/1625; C09D 5/1637; C09D 5/1687
USPC ........................................ 523/122
See application file for complete search history.

(56) References Cited

U.S. PATENT DOCUMENTS

2005/0238609 A1 10/2005 Potin

FOREIGN PATENT DOCUMENTS

| JP | 2012-024713 A | 2/2012 |
|---|---|---|
| KR | 1020030074241 A | 9/2003 |
| KR | 10-1431180 B1 | 8/2014 |

OTHER PUBLICATIONS

Wang Y., et al., "Photocurable Amphiphilic Perfluoropolyether/Poly(ethylene glycol) Networks for Fouling-Release Coatings", Macromolecules (2011) 44: 878-885.
Khan M.I., et al., "Recent developments in intrinsically conductive polymer coatings for corrosion protection", Chemical Engineering Research Bulletin 14 (2010) 73-86.
International Search Report issued in PCT/KR2015/009924, dated Nov. 12, 2015.
Written Opinion issued in PCT/KR2015/009924, dated Nov. 12, 2015.

*Primary Examiner* — Edward Cain
(74) *Attorney, Agent, or Firm* — Westman, Champlin & Koehler, P.A.; Amanda M. Prose

(57) ABSTRACT

This invention relates to amphiphilic hydrogel particles for antifouling paint, which are environmentally friendly and in which anti-corrosion and antifouling effects can be maximized through a single coating process. The amphiphilic hydrogel particles are fabricated by encapsulating conducting polymer particles having anti-corrosion functionality with functional nanoparticles having antifouling functionality and then immobilizing the functional nanoparticles on a hydrogel matrix, whereby the conducting polymer particles contained in the functional nanoparticles are slowly and continuously released or the release rate thereof can be controlled so as to release the corresponding particles in a specific environment, ultimately maintaining long-term functionality. The conducting polymer particles contained in the amphiphilic functional nanoparticles can exhibit anti-corrosion functionality, thus maximizing anti-corrosion and antifouling effects through a single coating process.

11 Claims, 10 Drawing Sheets

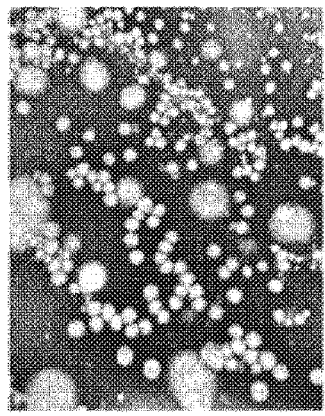 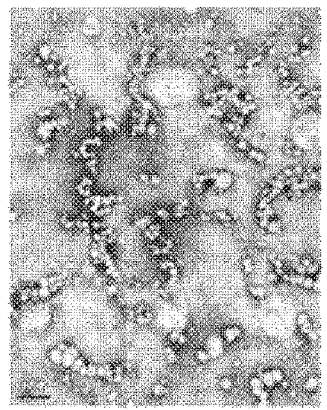 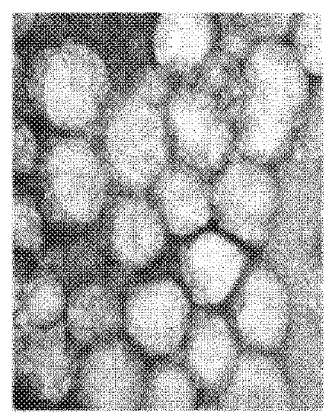
FIG. 3A     FIG. 3B     FIG. 3C
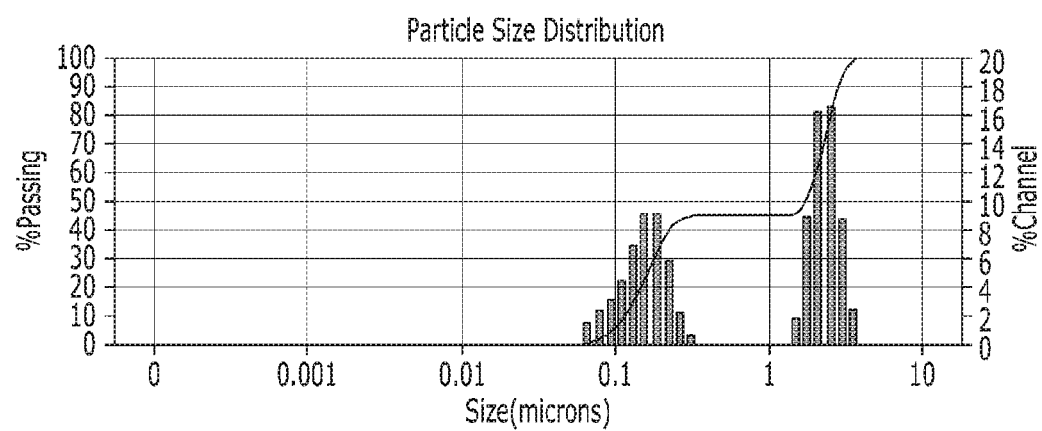
FIG. 4

AMPHIPHILIC HYDROGEL PARTICLES FOR ANTIFOULING PAINT AND METHOD OF FABRICATING THE SAME

CROSS REFERENCE TO RELATED APPLICATION

This application claims priority to Korean Patent Application No. 10-2015-0063187, filed May 6, 2015, the disclosure of which is incorporated by reference in its entirety.

TECHNICAL FIELD

The present invention relates to amphiphilic hydrogel particles for antifouling paint and a method of fabricating the same and, more particularly, to environmentally friendly amphiphilic hydrogel particles for antifouling paint, in which anti-corrosion and antifouling effects may be maximized through a single coating process, and to a method of fabricating the same.

BACKGROUND ART

There are many cases where a variety of aquatic organisms, including animals such as oysters, hard-shelled mussels, barnacles, etc., plants such as kelp, bacteria and the like, are attached to and propagate on the surfaces of bottoms of ships, underwater (marine) structures, and fishnets, which are exposed to water such as rivers or oceans for a long period of time, undesirably damaging the outer appearance of the ships or underwater structures and deteriorating the functionality thereof.

In an example, once marine microbes are attached to the marine structures of tidal current power plants, they may rapidly propagate, and a variety of marine organisms may also be attached by means of such microbes, undesirably lowering the power generation efficiency and promoting corrosion, resulting in serious negative effects on the safety of the marine structures.

In particular, when aquatic organisms become attached to or propagate on the bottoms of the ships, the total surface roughness of the ships may increase, undesirably reducing sailing speed and increasing fuel consumption. Furthermore, when bacteria, slime (sludge material) or large sessile organisms are attached to underwater structures, putrefaction or damage to anti-corrosive films may occur, undesirably deteriorating the strength or functionality of the underwater structures, whereby the lifetime thereof may be remarkably shortened. Hence, such aquatic organisms need to be removed from the bottoms of the ships. However, this work requires a lot of labor and takes a long time.

In order to prevent such damage, the bottoms of ships or underwater structures may be coated with various antifouling paints. Such antifouling paint may be applied on the surface of the ship under the surface of the water so as to prevent underwater animals and plants from being attached to the surface of the ship hull, thus reducing the frictional resistance of the ship. Recently, paints containing an organotin compound, mercury, a copper compound, etc., which are toxic to underwater organisms, have been used, but are gradually released from the surface of the ship hull into the water, and are thus regarded as a pollutant that negatively affects underwater organisms. Accordingly, the use of conventional toxic antifouling paints is restricted all over the world. For example, organotin compounds are very toxic, thus incurring marine pollution, the generation of mutant fish and shellfish, and harmful effects on ecosystems through the food chain.

With the goal of solving such problems, the present invention is intended to provide an environmentally friendly antifouling paint for preventing corrosion and the pollution of marine microbes. In the present invention, a conducting polymer having anti-corrosion functionality is primarily encapsulated with amphiphilic functional nanoparticles having antifouling properties, after which secondary microcapsules are formed using a hydrogel so that the conducting polymer contained in the nanoparticles is slowly and continuously released or is released in a specific environment, thereby improving anti-corrosion and antifouling properties.

In particular, the conducting polymer particles, which are positioned internally, may exhibit anti-corrosion functionality, ultimately maximizing anti-corrosion and antifouling effects through a single coating process.

CITATION LIST

Korean Patent No. 10-0521080

DISCLOSURE

Technical Problem

Accordingly, the present invention is intended to provide amphiphilic hydrogel particles for antifouling paint, which may prevent the corrosion and the pollution of marine microbes, and a method of fabricating the same.

Technical Solution

The present invention provides amphiphilic hydrogel particles for antifouling paint, comprising conducting polymers; functional nanoparticles in vesicle form containing the conducting polymers therein; and a hydrogel matrix on which the functional nanoparticles are immobilized.

The functional nanoparticles may be composed of a lipid, perfluoropolyether (PFPE) and cholesterol (FIG. 1).

The functional nanoparticles may be functional nanoparticles having antifouling functionality.

The functional nanoparticles may comprise a lipid, PFPE and cholesterol at a molar ratio of 8 to 6:1 to 3:1, and preferably a molar ratio of 6:3:1. When the molar ratio thereof falls in the above range, it is possible to fabricate spherical nanoparticles. In contrast, when the molar ratio thereof falls outside of the above range, the deformation of the spherical shape may occur, thus causing interparticular aggregation to thereby generate non-uniform particle size distribution.

The amphiphilic hydrogel particles for antifouling paint may comprise, based on the total weight of the amphiphilic hydrogel particles, 5 to 15 wt % of the conducting polymers, 30 to 50 wt % of the functional nanoparticles, and 35 to 65 wt % of the hydrogel matrix. When the amounts of these components fall in the above ranges, the functional nanoparticles containing the conducting polymers therein may be stably present within the hydrogel. In contrast, when the amounts thereof fall outside of the above ranges, the stability of the hydrogel matrix may become problematic, so that the functional nanoparticles may be released from the hydrogel.

The conducting polymers may have anti-corrosion functionality.

The conducting polymers may be exemplified by pyrrole-based polymers. Specifically, a pyrrole-based polymer, which may be dissolved in an aqueous solution, may be useful. More specifically, conducting polymers, such as polyaniline, polythiophene, polydodecyl, polypyrrole, etc., may be used.

The lipid may have a hydrophilic head group and a hydrophobic tail group. The lipid provides a typical frame for spherical particles.

PFPE has low surface energy, low toxicity, high gas permeability, and high hydrophobicity, thereby increasing the amphiphilic effects of the surface of the functional nanoparticles.

Cholesterol may function to form an ion channel in the nanoparticles in vesicle form to enable charge transfer between the internal material and the external material, thereby allowing the conducting polymers that exist in the functional nanoparticles to be released when corrosion occurs.

The lipid may be exemplified by a surfactant-based lipid such as sodium dodecyl sulfate (SDS).

The particle size of the functional nanoparticles may be 60 to 150 nm, and is preferably 100 nm or less. If the particle size thereof exceeds 150 nm, aggregation between the nanoparticles may easily occur, thus causing problems with the stability of the particles. In contrast, if the particle size thereof is less than 60 nm, the space inside the particles may decrease, making it difficult to accommodate as large a conducting polymer as necessary.

The hydrogel matrix may be formed using alginate or poly(2,2-dimethoxy nitrobenzylmethacrylate-r-methyl methacrylate-r-poly(ethylene glycol)methacrylate) (PDMP).

In addition, the present invention provides a method of fabricating amphiphilic hydrogel particles for antifouling paint using a microfluidic chip, the microfluidic chip comprising: a platform; a main channel formed in the platform to provide a vesicle-forming space; a first inlet channel for feeding a first component into the main channel; a discharge part for discharging a vesicle from the main channel; a second inlet channel disposed between the first inlet channel for feeding the first component into the main channel and the discharge part and configured to feed a second component into the main channel; and a micro-stencil, which is disposed at the outlet of the second inlet channel and has a plurality of microholes through which the solution fed into the second inlet channel passes, the method comprising:

feeding conducting polymers into the first inlet channel; feeding a lipid, PFPE and cholesterol into the second inlet channel, thus forming functional nanoparticles in vesicle form containing the conducting polymers therein; and immobilizing the functional nanoparticles on a hydrogel matrix, wherein the flow rate of the component fed into the first inlet channel or the second inlet channel is adjusted, thereby controlling the particle size of the functional nanoparticles.

The specific components and amounts used for the fabricating method as above are the same as in the description of the aforementioned amphiphilic hydrogel particles for antifouling paint, and a description thereof is omitted herein.

Advantageous Effects

According to the present invention, amphiphilic hydrogel particles for antifouling paint are configured such that conducting polymer particles having anti-corrosion functionality are encapsulated with functional nanoparticles having antifouling functionality and then the functional nanoparticles are immobilized on a hydrogel matrix, whereby the conducting polymer particles contained in the functional nanoparticles are slowly and continuously released, or the release rate thereof can be controlled so as to release the corresponding particles in a specific environment, ultimately maintaining long-term functionality. Also, since the conducting polymer particles contained in the amphiphilic functional nanoparticles can exhibit anti-corrosion functionality, anti-corrosion and antifouling effects can be maximized through a single coating process. Furthermore, the antifouling paint can be utilized in combination with conventional paint, thereby enhancing the functions of existing anti-corrosion/antifouling paint. Also, the antifouling paint according to the present invention can be used in a spray manner, and can thus be easily applied to structures having various shapes. Also, the amphiphilic hydrogel particles according to the present invention are composed of environmentally friendly components and have no harmful influence on ecosystems, unlike conventional antifouling paint.

DESCRIPTION OF THE DRAWINGS

FIGS. 3A to 3C are transmission electron microscope (TEM) images illustrating functional nanoparticles fabricated according to an embodiment of the present invention, wherein FIG. 3A shows the functional nanoparticles at a molar ratio of lipid to PFPE to cholesterol of 8:1:1, FIG. 3B shows the functional nanoparticles at a molar ratio of lipid to PFPE to cholesterol of 7:2:1, and FIG. 3C shows the functional nanoparticles at a molar ratio of lipid to PFPE to cholesterol of 6:3:1;

FIG. 4 illustrates the results of dynamic light scattering (DLS) analysis of the particle size distribution of the functional nanoparticles at a molar ratio of lipid to PFPE to cholesterol of 8:1:1 (average particle size: 158 nm);

FIGS. 10A to 10D are optical fluorescence microscope images illustrating the amphiphilic nanoparticles of Example 1 (the molar ratio of lipid to PFPE to cholesterol=6:3:1, the flow rate for the first inlet channel (inlet 1) of the microfluidic chip is fixed to 60 ml/h, and the flow rate for the second inlet channel (inlet 2) thereof is fixed to 1.5 ml/h), wherein FIGS. 10A to 10C show the alginate hydrogel, and FIG. 10D shows the PDMP hydrogel;

Figure 1:
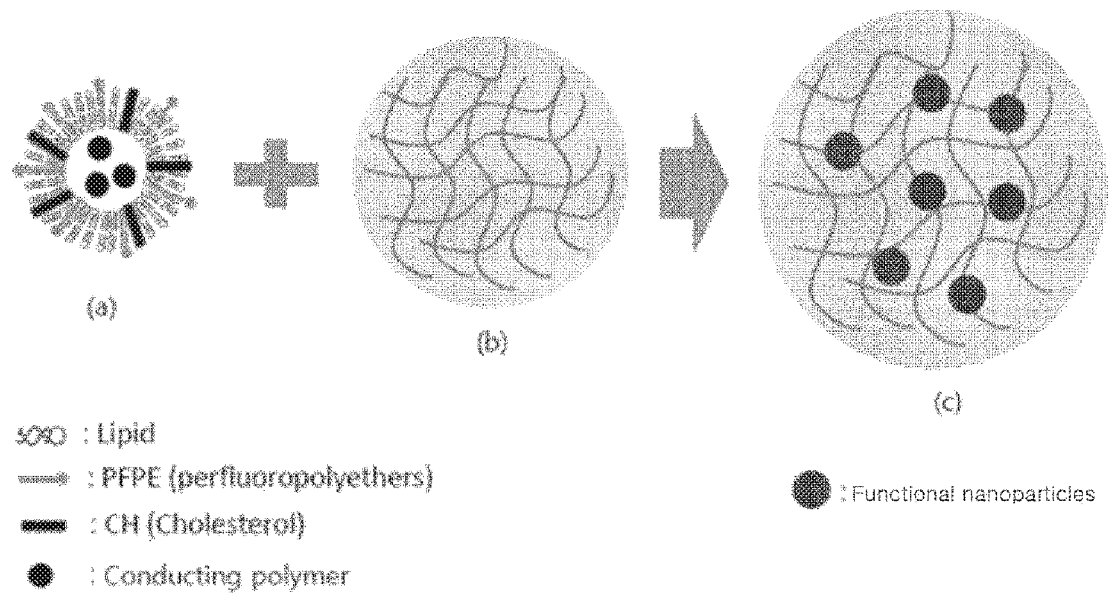
FIG. 1 schematically illustrates a process of fabricating antifouling paint particles according to an embodiment of the present invention (a: functional nanoparticles, b: hydrogel, c: amphiphilic hydrogel particles for antifouling paint)

<Description of the Reference Numerals in the Drawings>

10: microfluidic chip
A: conducting polymer
B: functional nanoparticle composition
(lipid + PFPE + cholesterol)
C: functional nanoparticles in vesicle form
12: first feed pipe
14: second feed pipe
16: discharge pipe
20: platform
21: main channel
22: first inlet channel
23: second inlet channel
24: discharge channel
25: outlet of second inlet channel
26: interface between A and B
27: upper end of main channel
30: microhole array of micro-stencil
32: microhole
34: micro-stencil

MODE FOR INVENTION

Hereinafter, a detailed description will be given of the present invention with reference to the following examples. The purposes, features, and advantages of the present invention will be easily understood through the following examples. The present invention is not limited to such examples, but may be embodied in other forms. The following examples are provided such that the spirit of the present invention may be sufficiently transferred to those skilled in the art to which the present invention belongs. Therefore, the following examples are not to be construed as limiting the present invention.

Examples 1 and 2

Formation of Amphiphilic Hydrogel Particles for Antifouling Paint

Formation of Functional Nanoparticles

Figure 2A:
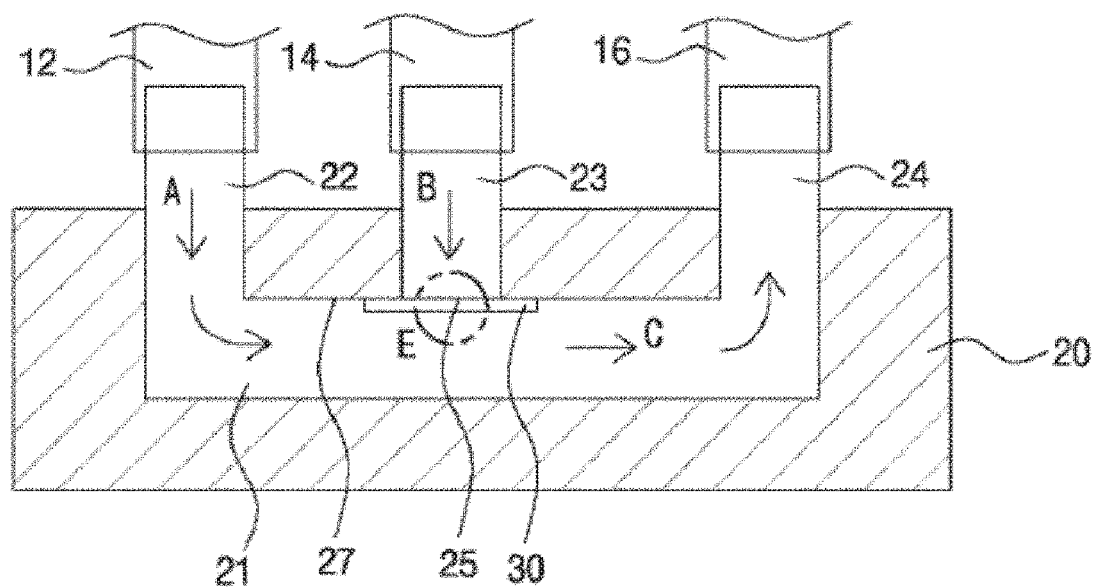
FIG. 2A schematically illustrates the cross-section of a microfluidic chip for fabricating amphiphilic nanoparticles according to an embodiment of the present invention.
Figure 2B:
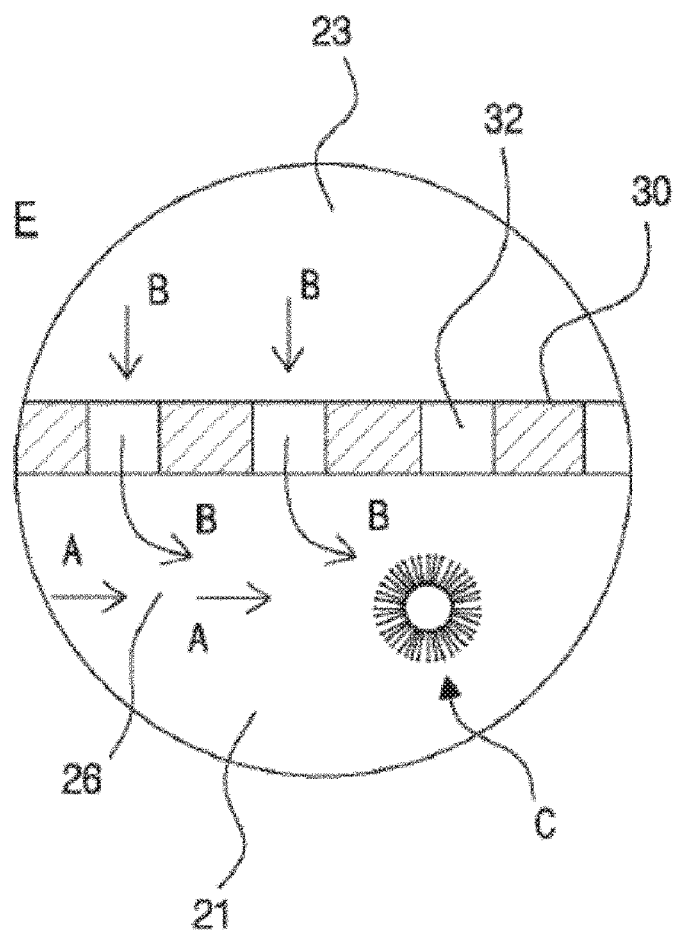
FIG. 2B is an enlarged view of Part E of FIG. 2A, and FIG. 2C schematically illustrates a micro-stencil disposed at the outlet of the second inlet channel.
Figure 2C:
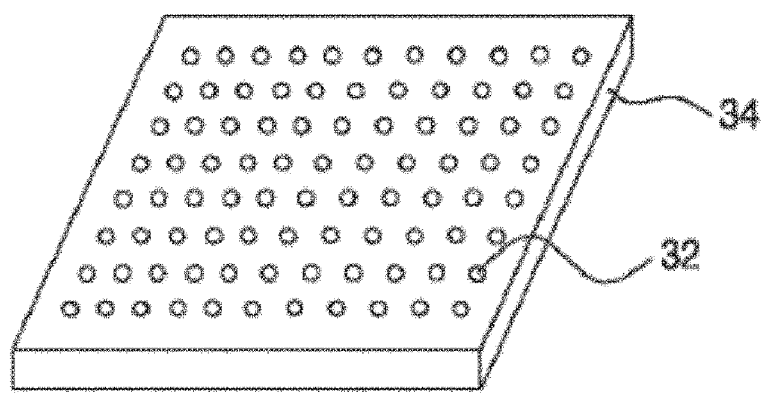

Amphiphilic nanoparticles were fabricated using a microfluidic chip provided with a micro-stencil. The microfluidic chip comprises a platform, a main channel formed in the platform to provide a vesicle-forming space, a first inlet channel (inlet 1) for feeding conducting polymers, a second inlet channel (inlet 2) for feeding a composition for forming functional nanoparticles, and a discharge channel for discharging the functional nanoparticles in vesicle form from the main channel (FIGS. 2A to 2C). The micro-stencil was fabricated through a dewetting-assisted molding process in which a silicone wafer with a pillar structure and PUA (polyurethane acrylate) are used.

A 5 mM conducting polymer polypyrrole aqueous solution was fed at a flow rate of 60 ml/h into the first inlet channel, and a composition for functional nanoparticles comprising sodium dodecyl sulfate (SDS), PFPE, and cholesterol (CH) at the following molar ratio was fed at a flow rate of 1.5 ml/h into the second inlet channel, thus obtaining functional nanoparticles in vesicle form. As such, the molar ratio of lipid (SDS) to PFPE to cholesterol corresponding to the composition for functional nanoparticles fed into the second inlet channel was set to 8:1:1, 7:2:1, and 6:3:1.

TEM Image and Particle Size Distribution Analysis of Functional Nanoparticles

Figure 5:
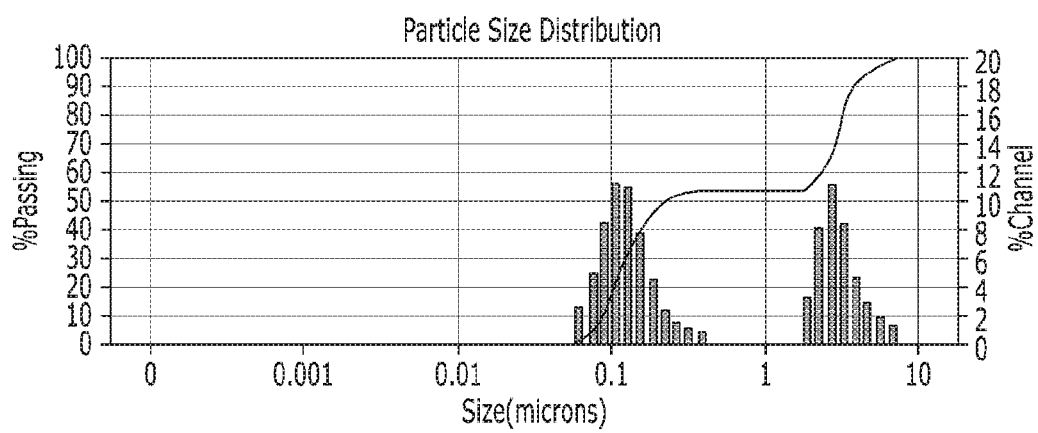
FIG. 5 illustrates the results of DLS analysis of the particle size distribution of the functional nanoparticles at a molar ratio of lipid to PFPE to cholesterol of 7:2:1 (average particle size: 130 nm)
Figure 6:
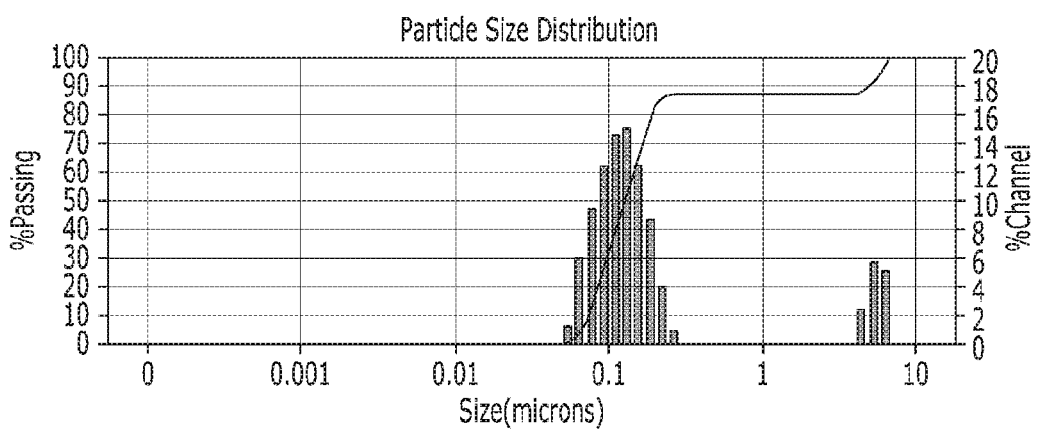
FIG. 6 illustrates the results of DLS analysis of the particle size distribution of the functional nanoparticles at a molar ratio of lipid to PFPE to cholesterol of 6:3:1 (average particle size: 120 nm)

The shapes of the particles at different molar ratios were analyzed through TEM. The results are illustrated in FIGS. 3A to 3C. The results of DLS analysis of the particle size distribution depending on the molar ratio are illustrated in FIGS. 4 to 6. Based on the results of analysis of TEM images, the uniformity of the particle size distribution can be seen to vary depending on the constituent ratio of lipid to PFPE to cholesterol. As the amount of PFPE was increased, uniform particles could be realized. As for the results of DLS analysis, when the molar ratio of lipid to PFPE to cholesterol was 8:1:1, particles having an average particle size of 158 nm were present in an amount of 54%, and microsized particles were distributed. Also, when the molar ratio of lipid to PFPE to cholesterol was 7:2:1, particles having an average particle size of 130 nm were present in an amount of 60%, and a large number of microsized particles were present. Also, when the molar ratio of lipid to PFPE to cholesterol was 6:3:1, particles having an average particle size of 120 nm were present in an amount of 86%, and had an almost uniform particle size distribution.

The particle size of the functional nanoparticles depending on the flow rate (1.5, 3.0, and 6.0 ml/h) for the second inlet channel was analyzed. The results are shown in Table 1 below and in FIGS. 7 to 9. The molar ratio of lipid to PFPE to cholesterol corresponding to the composition for functional nanoparticles fed into the second inlet channel was set to 6:3:1.

TABLE 1

| Flow rate | 60 ml/h-1.5 ml/h | | 60 ml/h-3 ml/h | | 60 ml/h-6 ml/h | |
|---|---|---|---|---|---|---|
| Size, Amount | Size (nm) | Amount (%) | Size (nm) | Amount (%) | Size (nm) | Amount (%) |
| 1 | 63.7672 | 23.41065 | 78.22465 | 35.60465 | 96.93386 | 31.31882 |
| 2 | 75.29761 | 33.12682 | 92.50484 | 32.21644 | 115.5789 | 30.0843 |
| 3 | 88.91296 | 23.26963 | 109.392 | 20.13168 | 137.8102 | 24.34466 |
| 4 | 104.9903 | 12.67082 | 129.3619 | 7.923722 | 164.3176 | 9.53383 |
| 5 | 123.9746 | 5.160104 | 152.9774 | 2.825472 | 195.9238 | 3.355517 |
| 6 | 146.3918 | 1.815303 | 180.904 | 0.914489 | 233.6093 | 1.036227 |

TABLE 1-continued

| Flow rate | 60 ml/h-1.5 ml/h | | 60 ml/h-3 ml/h | | 60 ml/h-6 ml/h | |
|---|---|---|---|---|---|---|
| Size, Amount | Size (nm) | Amount (%) | Size (nm) | Amount (%) | Size (nm) | Amount (%) |
| 7 | 172.8625 | 0.455785 | 213.9287 | 0.298615 | 278.5434 | 0.272389 |
| 8 | 204.1195 | 0.084349 | 252.9822 | 0.073368 | 332.1206 | 0.048997 |
| 9 | 241.0285 | 0.006526 | 299.165 | 0.011562 | 396.0032 | 0.005255 |
| Total | | 100% | | 100% | | 100% |

Figure 7:
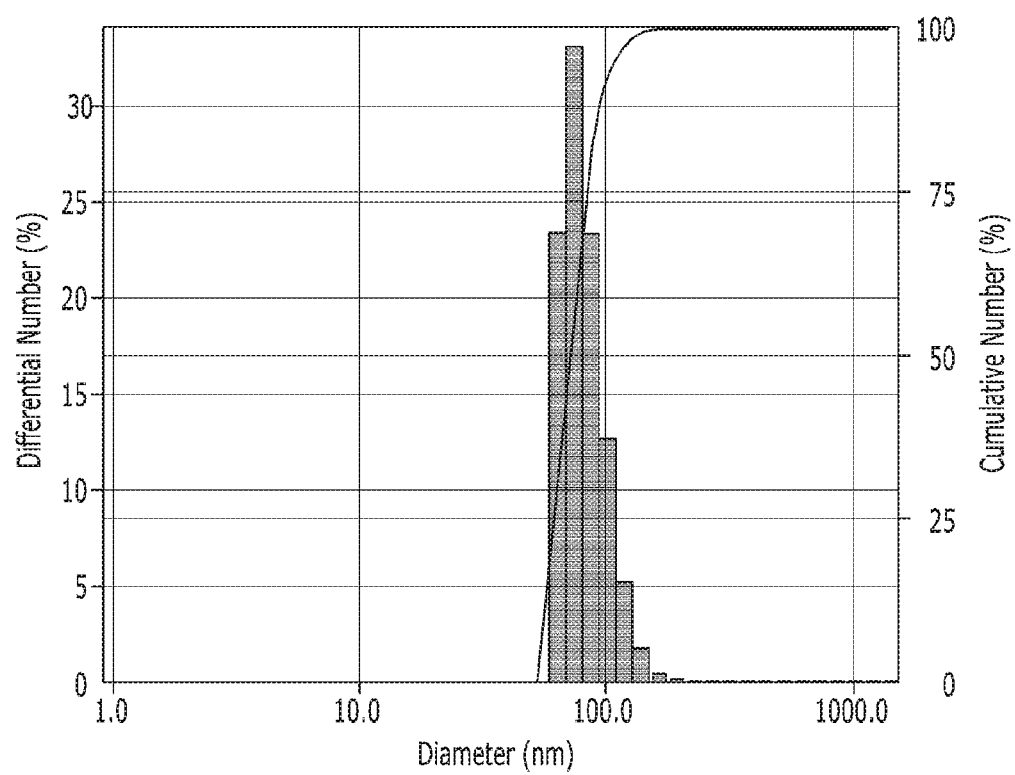
FIG. 7 illustrates the results of DLS analysis of the particle size distribution of the functional nanoparticles fabricated under the conditions that the flow rate for the first inlet channel (inlet 1) of the microfluidic chip is fixed to 60 ml/h and the flow rate for the second inlet channel (inlet 2) thereof is fixed to 1.5 ml/h (the molar ratio of lipid to PFPE to cholesterol=6:3:1)
Figure 8:
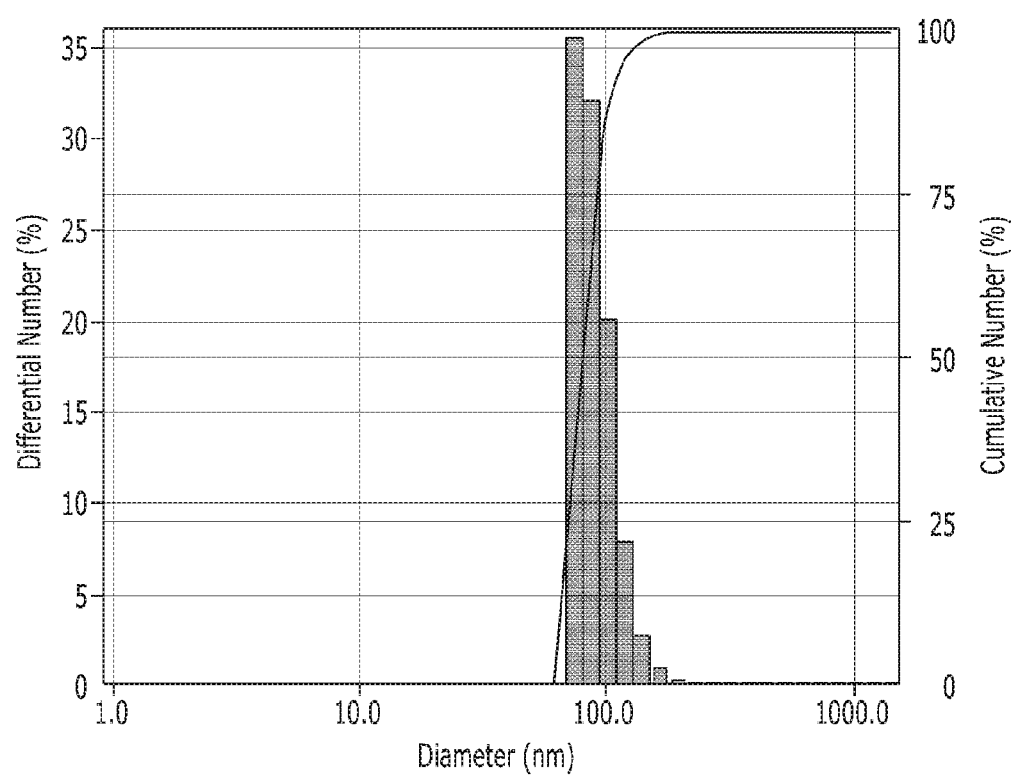
FIG. 8 illustrates the results of DLS analysis of the particle size distribution of the functional nanoparticles fabricated under the conditions that the flow rate for the first inlet channel (inlet 1) of the microfluidic chip is fixed to 60 ml/h and the flow rate for the second inlet channel (inlet 2) thereof is fixed to 3 ml/h (the molar ratio of lipid to PFPE to cholesterol=6:3:1)
Figure 9:
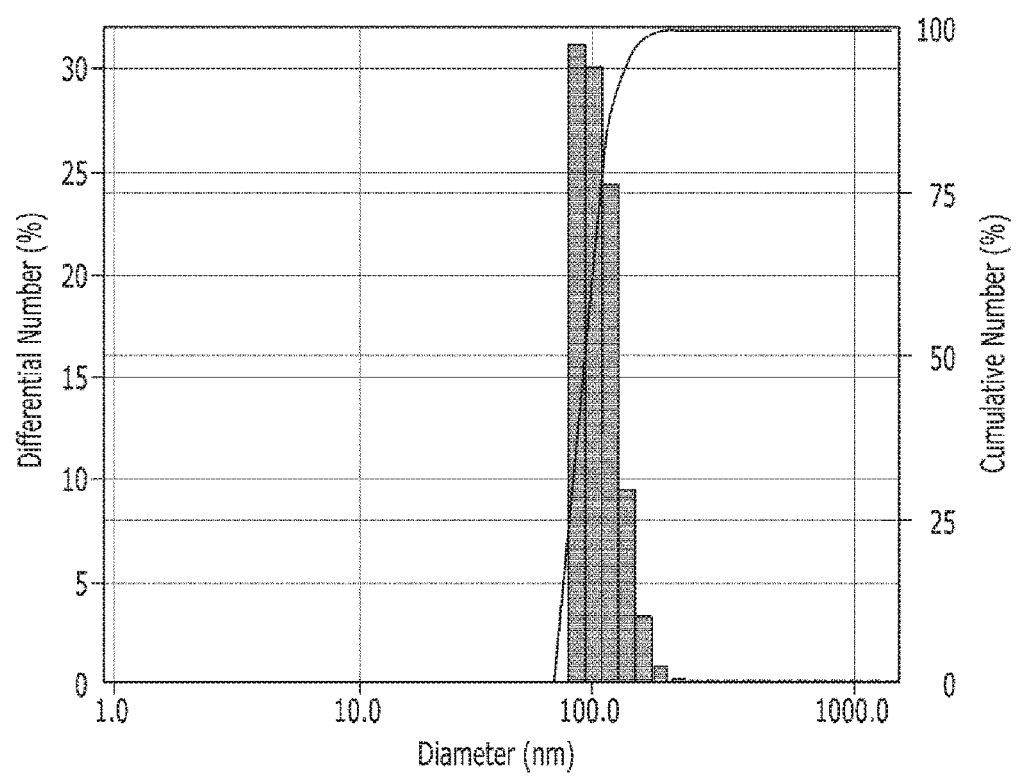
FIG. 9 illustrates the results of DLS analysis of the particle size distribution of the functional nanoparticles fabricated under the conditions that the flow rate for the first inlet channel (inlet 1) of the microfluidic chip is fixed to 60 ml/h and the flow rate for the second inlet channel (inlet 2) thereof is fixed to 6 ml/h (the molar ratio of lipid to PFPE to cholesterol=6:3:1)

FIGS. 7 to 9 illustrate the particle size distributions as analyzed using DLS. As illustrated in FIGS. 7 to 9, the particle size distribution uniformity of 90% or more was exhibited.

As is apparent from Table 1, when the flow rate for the second inlet channel (inlet 2) was 1.5 ml/h, nanoparticles having a particle size of 100 nm or less could be prepared. When the flow rate therefor was 6 ml/h, a particle size distribution of 120 nm was manifested. It was possible to control the particle size of the nanoparticles by adjusting the flow rate for the microfluidic chip.

Preparation of Amphiphilic Hydrogel Particles for Antifouling Paint

The functional nanoparticles, which were fabricated by the above method using lipid, PFPE and cholesterol at a molar ratio of 6:3:1 under the condition that the flow rate for the second inlet channel (inlet 2) was 1.5 ml/h, were immobilized on a hydrogel matrix through the following method, thus obtaining amphiphilic hydrogel particles for antifouling paint.

Example 1

Formation of Amphiphilic Hydrogel Particles for Antifouling Paint Using Alginate Polymer In order to immobilize the functional nanoparticles on a hydrogel matrix, a dropping system using a centrifuge was adopted. Specifically, two 1 ml syringes were fixed to a 50 ml tube, and two 4 cm sized 25 G needles were set so that the ends thereof were in contact with each other. A CaCl$_2$ solution for cross-linking an alginate polymer was placed in the bottom of the tube. A mixture solution comprising 0.5 to 4 wt % of an alginate solution and a functional nanoparticle solution mixed at a ratio of 2:1 was placed in one syringe, and a 0.5 to 4 wt % alginate solution was placed in the other 1 ml syringe. Then, dropping was performed using a centrifuge at 100 g for 5 min, yielding a hydrogel matrix having functional nanoparticles immobilized thereon.

Example 2

Formation of Amphiphilic Hydrogel Particles for Antifouling Paint Using PDMP Polymer PDMP hydrogel particles were obtained by radiating UV light (365 nm) to the bottom of the channel at regular intervals while passing a mixture solution comprising a solution of PDMP polymer dissolved in 1,4-dioxane (10 w/v %) and functional nanoparticles mixed at a ratio of 2:1 through the channel at a flow rate of 10 ml/h using a microfluidic chip.

Test Example 1

Analysis of Shape of Amphiphilic Hydrogel Particles for Antifouling Paint

Figure 10A:
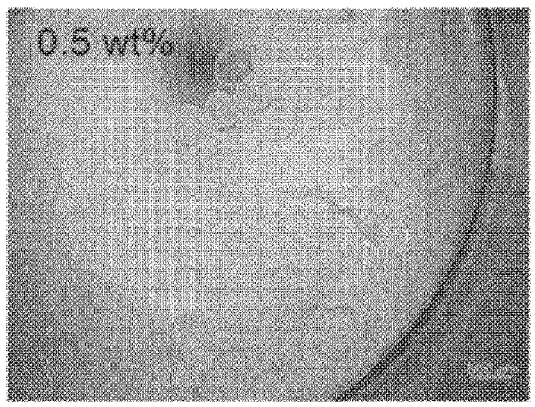
Figure 10B:
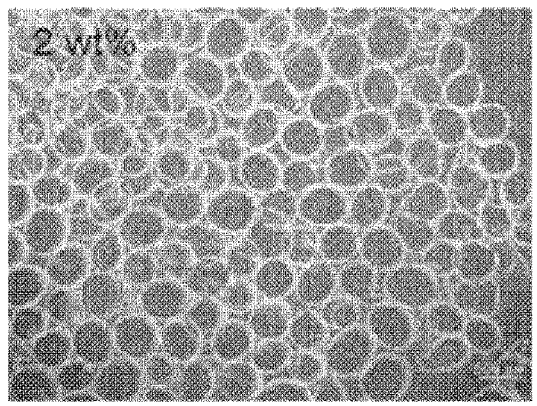
Figure 10C:
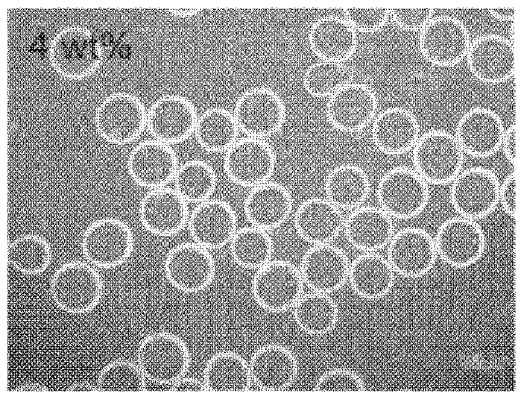
Figure 10D:
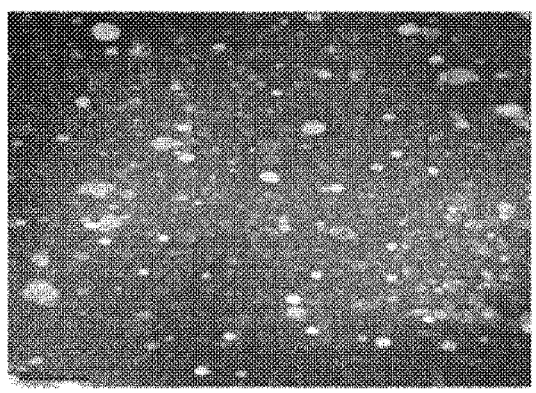
Figure 11:
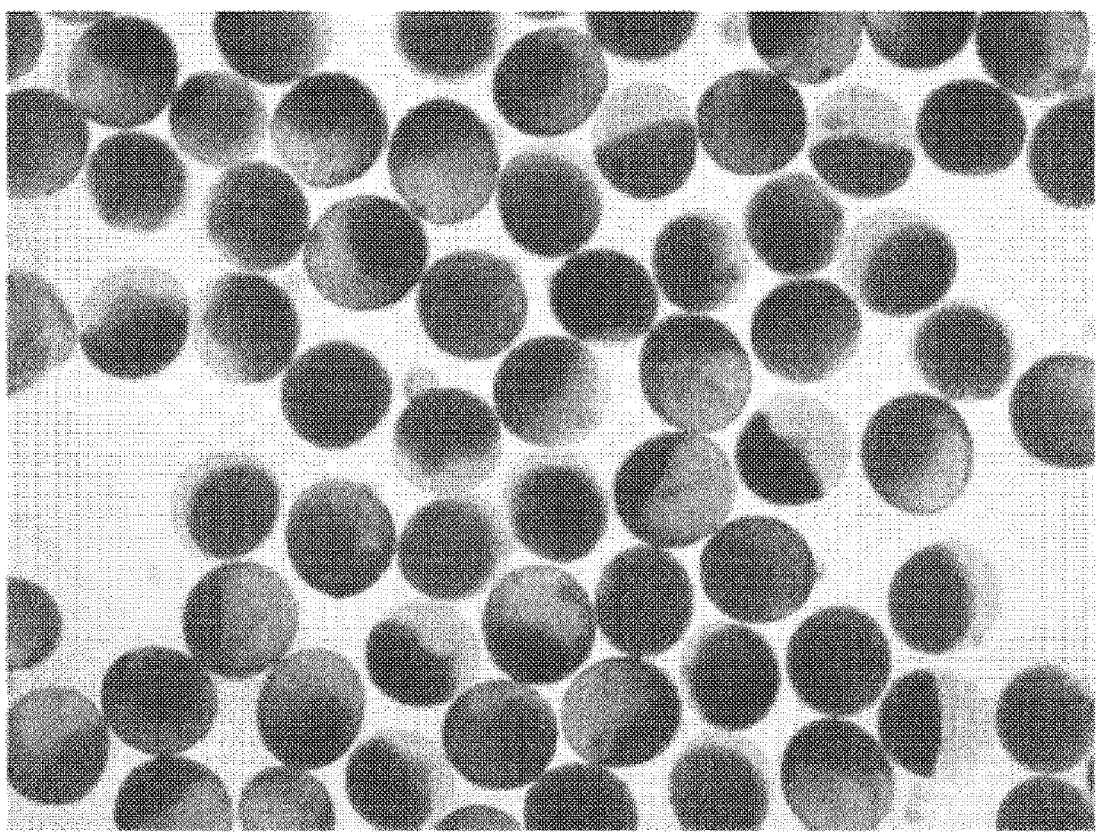
FIG. 11 is an optical fluorescence microscope image illustrating the amphiphilic hydrogel particles of FIG. 10C.

The surface of the amphiphilic hydrogel particles of Example 1 was observed using an optical fluorescence microscope (Nikon). The results are shown in FIGS. 10A to 10D. As illustrated in FIGS. 10A to 10C, the density and shape of the produced particles became different depending on the amount of alginate. When the amount of alginate was 4 wt %, a large amount of gel type spherical particles could be efficiently formed (FIG. 10C). When using PDMP, the particles were fabricated to be small and irregular (FIG. 10D). FIG. 11 is an optical fluorescence microscope image illustrating the amphiphilic hydrogel particles obtained using 4 wt % of alginate. The amphiphilic hydrogel particles can be seen to have a spherical shape. In FIG. 11, the black portions correspond to the functional particles.

Test Example 2

Analysis of Antifouling Properties of Amphiphilic Hydrogel Particles for Antifouling Paint In order to evaluate the antifouling properties of the amphiphilic hydrogel particles, three samples were prepared as follows.

Sample 1: Control sample (SUS 304, stainless steel)
SUS having a size of 1 T×30 mm×60 mm was used as a control sample.

Sample 2: Hydrogel coating sample
A hydrogel obtained using a PDMP polymer (which was used after having been dissolved in 1,4-dioxane (10 w/v %)) was applied on Sample 1.

Sample 3: Sample Coated with Amphiphilic Hydrogel Particles

Sample 1 was coated, using a spray process, with the amphiphilic hydrogel particles (Example 2) obtained by immobilizing, on the hydrogel matrix using a PDMP polymer, the functional nanoparticles (average particle size: 100 nm) fabricated by the above method using lipid, PFPE and cholesterol at a molar ratio of 6:3:1 under the condition that the flow rate for the second inlet channel (inlet 2) was 1.5 ml/h.

Figure 12A:
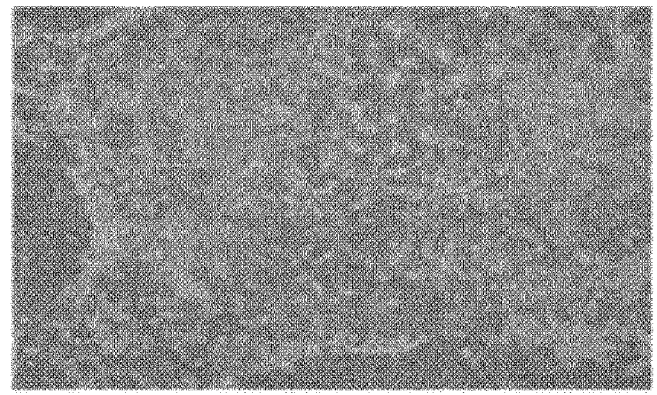
FIGS. 12A, 12B, and 12C respectively illustrate SUS, hydrogel particles, and amphiphilic hydrogel particles in order to compare the antifouling properties of the amphiphilic hydrogel particles of Example 2 with those of the other samples.
Figure 12B:
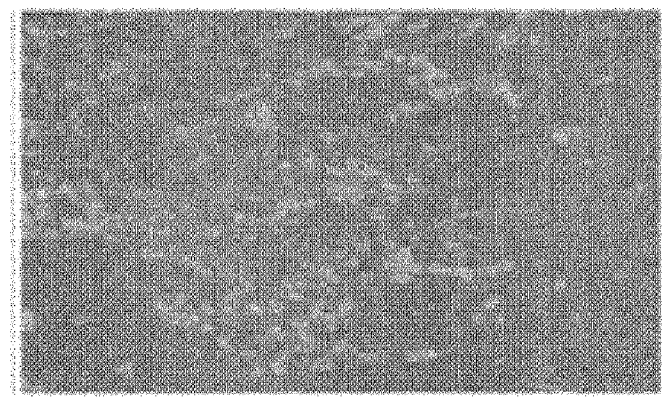
Figure 12C:
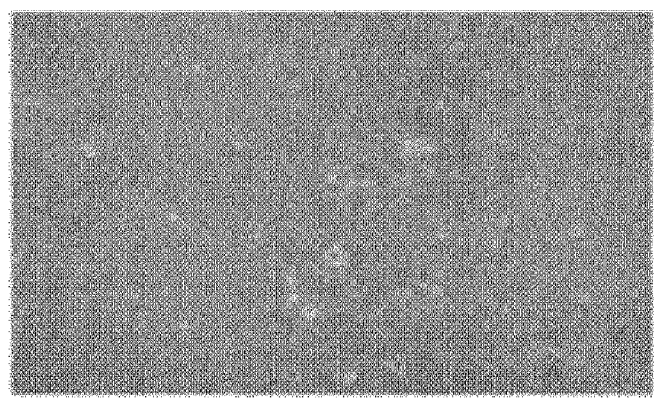

For analysis, each of the three samples was placed in an Uldolmok microbe diluted solution (a solution (10% v/v) obtained by diluting an incubated solution of *Bacillus firmus*, one of the microbes sampled near Uldolmok Tidal Current Power Pilot Plant, 2012, with an artificial seawater solution). After ten days, the extent of surface pollution of the samples was observed. The results are shown in FIGS. 12A to 12C (Test conditions: enrichment broth—Artificial Marin Broth, enrichment conditions—25° C./100 r/m/240 hr). Consequently, the amphiphilic hydrogel particles exhibited the lowest surface pollution.

Although the preferred embodiments of the present invention have been disclosed for illustrative purposes, those skilled in the art will appreciate that various modifications, additions and substitutions are possible, without departing from the scope and spirit of the invention as disclosed in the accompanying claims

The invention claimed is:

1. Amphiphilic hydrogel particles for antifouling paint, comprising:
   conducting polymers;
   functional nanoparticles in vesicle form containing the conducting polymers therein; and
   a hydrogel matrix on which the functional nanoparticles are immobilized.

2. The amphiphilic hydrogel particles of claim 1, wherein the functional nanoparticles comprise a lipid, perfluoropolyether (PFPE) and cholesterol.

3. The amphiphilic hydrogel particles of claim 2, wherein the functional nanoparticles comprise the lipid, the PFPE and the cholesterol at a molar ratio of 8 to 6:1 to 3:1.

4. The amphiphilic hydrogel particles of claim 1, wherein the functional nanoparticles have antifouling functionality.

5. The amphiphilic hydrogel particles of claim 1, comprising, based on a total weight of the amphiphilic hydrogel particles:
   5 to 15 wt % of the conducting polymers;
   30 to 50 wt % of the functional nanoparticles; and
   35 to 65 wt % of the hydrogel matrix.

6. The amphiphilic hydrogel particles of claim 1, wherein the conducting polymers have anti-corrosion functionality.

7. The amphiphilic hydrogel particles of claim 1, wherein the conducting polymers comprise pyrrole-based polymers.

8. The amphiphilic hydrogel particles of claim 2, wherein the lipid has a hydrophilic head group and a hydrophobic tail group.

9. The amphiphilic hydrogel particles of claim 2, wherein the lipid comprises a surfactant-based lipid.

10. The amphiphilic hydrogel particles of claim 1, wherein the functional nanoparticles have a particle size of 60 to 150 nm.

11. A method of fabricating amphiphilic hydrogel particles for antifouling paint using a microfluidic chip, the microfluidic chip comprising: a platform; a main channel formed in the platform to provide a vesicle-forming space; a first inlet channel for feeding a first component into the main channel; a discharge part for discharging a vesicle from the main channel; a second inlet channel located between the first inlet channel for feeding the first component into the main channel and the discharge part and configured such that a second component is fed into the main channel; and a micro-stencil, which is disposed at an outlet of the second inlet channel and has a plurality of microholes through which the component fed into the second inlet channel passes, the method comprising:
   feeding conducting polymers into the first inlet channel;
   feeding a lipid, PFPE and cholesterol into the second inlet channel, thus forming functional nanoparticles in vesicle form containing the conducting polymers therein; and
   immobilizing the functional nanoparticles on a hydrogel matrix,
   wherein a flow rate of the component fed into the first inlet channel or the second inlet channel is adjusted, thereby controlling a particle size of the functional nanoparticles.

* * * * *